(No Model.)

F. G. WATERHOUSE.
DYNAMO ELECTRIC MACHINE.

No. 311,547. Patented Feb. 3, 1885.

Witnesses
Howard Stillman
William H. Colclough

Inventor
Frank G. Waterhouse
Attorney

UNITED STATES PATENT OFFICE.

FRANK G. WATERHOUSE, OF SACRAMENTO, CALIFORNIA.

DYNAMO-ELECTRIC MACHINE.

SPECIFICATION forming part of Letters Patent No. 311,547, dated February 3, 1885.

Application filed February 19, 1884. (No model.)

*To all whom it may concern:*

Be it known that I, FRANK G. WATERHOUSE, a citizen of the United States, residing in the city of Sacramento, county of Sacramento and State California, have invented a new and useful Improvement in Dynamo-Electric Machines, of which the following is a specification.

My invention relates to improvements in the armature of dynamo-electric generators and motors; and it consists of a novel method of winding the wire on the armature, and in the manner of directing the currents of electricity which flow or are generated in the wire of the armature.

The object of my invention is to wind the wire and direct the flow of the currents in the wire of the armature in such a way as to prevent the body of the armature from being magnetized by the wire on the armature, or to prevent the current flowing in the wire of the armature from magnetizing the body of the armature in opposition to the magnetism induced in the armature by the magnetic fields of force between which the armature rotates. The method by which I obtain this object will be shown by reference to the accompanying drawings.

Figure 1:
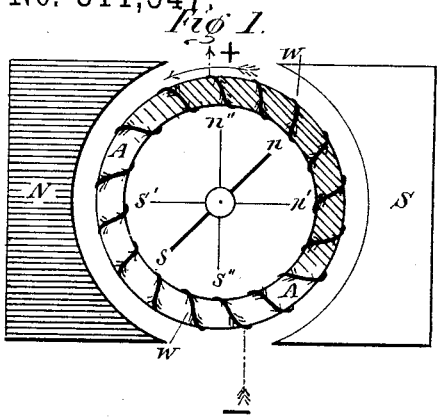
Figure 2:
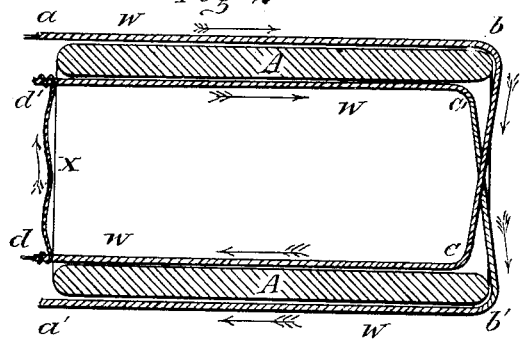
Figure 3:
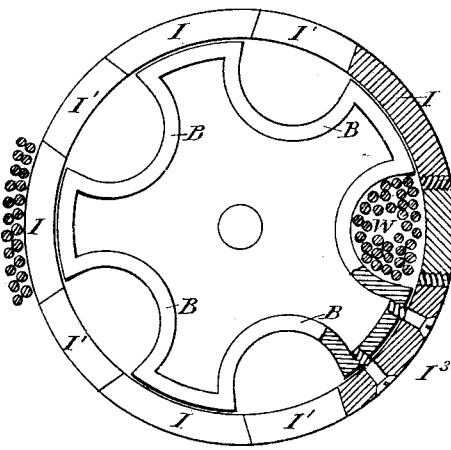
Figure 4:
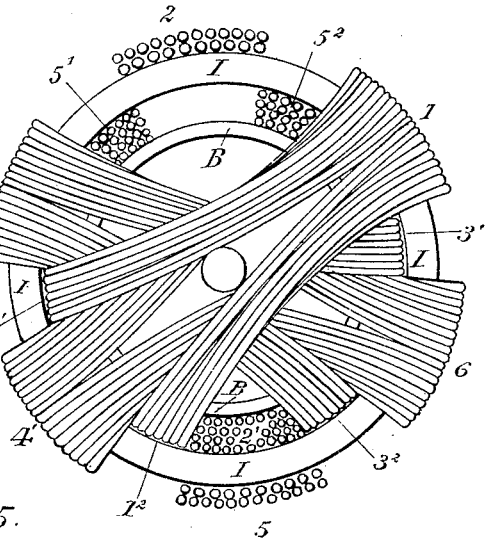
Figure 5:
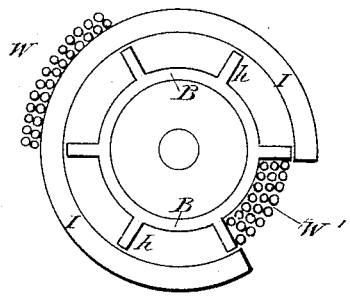

Figure 1 shows the four parts of a common electric generator, which are, N the north pole of the field-magnet, S the south pole of the field-magnet, A the ring form of armature, and W the wire on the armature. Fig. 2 shows a longitudinal sectional view of an armature, with wire W coiled on the armature, according to the method embodied in my invention. Figs. 3, 4, and 5 show end views of armatures adapted for receiving wire arranged according to my invention.

By referring to Fig. 1 the four elemental parts of a generator of what is known as the "Gramme" or ring type are shown, consisting of the north and south poles of field-magnets, the armature A, and the wire W on the armature. When the armature A is rotated, say in the direction of the curved arrow, a current is generated in the wire W, say in the direction shown by the small darts. The current enters at —, by means of a commutator, (not shown) and divides, passing around each half of the armature, and out at +, so when a current is passing around the armature, as shown by small darts on the wire, its effect is to magnetize the iron of the armature approximately at right angle to the magnetism induced in the armature by the field-magnet N and S—that is, the wire on the armature will tend to magnetize the armature so that its solar lines will be from $n''$ to $s''$, while the field-magnets N S tend to magnetize the armature, so that its polar lines will be from $n'$ to $s'$. The result is that the mean polar line will be an average between the two lines given, and will be deflected to about from $n$ to $s$, according to the strength of the two opposing forces. The result will be about as shown. The dark lines represent the location of a north polarity on both the field-magnets and the armature, while the white represents the opposite or a south polarity. Therefore, what are known as the magnetic lines of force, will cross from the dark field to the white part of the armature, and from the dark part of the armature to the white part of the field-magnet, and as the dark stands for the N polarity, and the white for S polarity, the lines of force will cross from dark to white, and where dark and dark or white and white oppose each other no lines of force will cross, and therefore no current is induced in the wire W while it passes between the dark or white places, but only between the dark and white places. The result is that a large amount of the working capacity of a generator is lost by this deflection due to the magnetizing effect of the wire on the armature upon itself. The disadvantage of this deflection is not only in the loss of capacity in the machine, but it opens a prolonged neutral place through which the wire on the armature passes without performing any energizing duty, and allows the current from the more active part of the wire to return through this inactive wire, which results in what is known as "short-circuiting," and many disadvantages which can only be remedied by complicated means of commutating or cutting out the coils as they pass these neutral places.

In order to remedy the above and any other defects that result from the causes stated, I have invented my improvement in arranging the wires on the armature so as to prevent the current while passing through the wires from having any magnetizing effect upon the iron or material composing the body of the armature. I perform this, as shown in Fig. 2, by winding the wire on the armature, by beginning, say, at $a$, and running along the outside of the armature-iron A to $b$, then across the end of the armature to $c$, then inside of the iron through the armature to $d$. The wire is wound all around the armature in this way, either in layers or bobbins, so that as in this Fig. 2 the wire is wound on one side of the armature from $a$ to $b$, $c$, and $d$, while on the other side it is wound from $a'$ to $b'$, $c'$, and $d'$, so that when the two ends of the opposite coils are connected, as by wire $x$, or by any of the known means of commutating, the current passing in at $a$ flows in the direction shown by arrows by way of $a\ b\ c\ d\ x\ d'\ c'\ b'$ to $d'$, so that while the current is passing in opposite directions on opposite sides of the armature, the current on any one side of the armature is passing in the same direction both inside and outside of the iron composing the armature. The result is that the magnetizing effect of the current on the outside of the armature is counteracted by the current on the inside of the armature. Therefore no magnetic effect is produced upon this armature by a current passing through the wires wound thereon.

Fig. 3 shows an end view of an armature adapted to being wound as above described. I I' are iron segments which extend the length of the armature and form a complete iron ring. Inside of the iron is a brass or non-magnetic spider, B, to which the iron segments, marked I, are secured by screws or other means, as shown by the segment marked I$^2$, in which are two screws shown. The other set of segments, marked I' are secured between each two segments, marked I, by means of the screws $s\ s$ in segment I$^2$, or by being dovetailed or slid in their places by any convenient means, the object being to have part of the segments removable, so that they can be put back in their places after the wire is wound under them, as shown by the coil of wire marked $w$ and $w'$, (see Fig. 3,) which represents a coil of wire cut in two, wound on the outside of the iron at $w$, and in the recess formed in the brass spider at $w'$ the segment I$^2$ is secured in its place, and in this way all the coils are wound on the armature.

Fig. 4 shows an end view of an armature with six coils of wire wound on it, two of the coils, marked 2 and 5, being cut in two to show the method of winding coil 2 on the outside of the iron at 2 and on the inside of the iron at 2', while the opposite coil, marked 5, is wound on the outside of the iron at 5, and on the inside it is divided and wound in at 5' and 5$^2$, and in that way each opposite pair of coils is wound on the armature.

Fig. 5 shows a form of armature adapted to receive coils of wire arranged according to my invention, in which I is one of a number of open iron rings, which, placed side by side, form the length of the armature. B is a brass cylinder or spider provided with radial arms $p$, which keep the rings I concentric with B, at the same time leaving recesses between the rings I, cylinder B, and arms $p$, for coils of wire, such as at W'. W is a coil of wire wound on the outside of the iron at W and on the inside of the iron and on the brass cylinder at W'. After the coil W W' is wound in its place, the open spaces in the rings I are turned around in position for receiving the next coil, and so on.

I have not attempted to show how these armatures are hung on a central shaft, nor how the coils are commutated and connected together, as they may be connected or commutated by either the closed or open circuit method common to other armatures, as none of these subjects bear special relation to my form of winding, as set forth.

I do not confine myself to exact forms of constructing the armatures for winding, as above set forth, as I know the same may be accomplished in many different ways. In showing and claiming the coils wound with the wire inside of the iron, opposite or across the armature, from the part of the same coil that is outside of the iron, I do not confine myself to exactly the diametrical opposite positions any more than would be sufficient to partially produce a counter-magnetic effect. So I mean by "opposite" any point as near opposite as can be secured in practice, if it is only within forty-five degrees (more or less) from exactly opposite.

The real object of this invention is to have a current pass through the conductors of the armature, so that the conductors inside of the iron of the armature will carry a current in the same direction as that flowing through the conductors on the outside of the armature, and in order to accomplish this purpose I do not wish to be confined to the exact method shown, for the reason that the same idea can be accomplished in various and divers ways—such, for instance, as by winding all the wire that lies inside of the iron of the armature in a separate coil—and then, after winding the wire on the outside of the armature, the two coils—that is, the outside and the inside wire—can be connected together in series, or otherwise, so that the current will flow as stated, to wit: The current passing in at $a$ flows in the direction shown by arrows, by way of $a\ b\ c\ d\ x\ d'\ b'\ c'$ to $a'$, so that while the current is passing in opposite directions on opposite sides of the armature the current on any one side of the armature is passing in the same direction, both inside and outside of the iron composing the armature. The inside and outside wires may be connected by any of the known means of connecting or commutating coils.

What I claim as my invention is—

1. An armature having conductors which form a path for an electric current on the outside of the iron in the armature, and also a path for a current inside of the iron of the armature, wound and connected as described, whereby the current in the opposite conductors on the outside of the iron will flow in opposite directions, and the current in the opposite conductors on the inside of the iron will flow in opposite directions, and the current in the conductors on any one side of the armature will flow in the same direction, both outside and inside of the iron composing the armature, substantially as and for the purposes as set forth.

2. In a dynamo-electric machine, an armature composed of a number of coils any one of which form an electrical path extending along the outside of the iron or cylinder on one side of the armature and along the inside of the iron ring or cylinder at or near the opposite side of the armature, substantially as and for the purposes as set forth.

3. In a dynamo-electric machine, an armature wound with wire or conductors forming an electrical path running longitudinally along the outside of the iron composing the armature, then crossing at the end of the armature and running on the opposite side of the armature inside of the iron, substantially as and for the purposes set forth.

4. In a dynamo-electric machine, a hollow cylinder or ring armature provided with conductors a single strand of which forms an electrical path commencing on the outside of the armature, at one end, extending longitudinally along the outside of the armature, then crossing diametrically, then returning longitudinally on the inside of the iron of the armature, then crossing back to the place of beginning, substantially as and for the purposes set forth.

5. In a dynamo-electric machine, an armature composed of an iron ring, I, in combination with a non-magnetic core or spider, B, having a recess or recesses for the wire or conductors W, between the iron I and spider B, substantially as and for the purposes set forth.

FRANK G. WATERHOUSE.

Witnesses:
    HOWARD STILLMAN,
    WILLIAM H. COLCLOUGH.